(12) United States Patent
Miranda et al.

(10) Patent No.: US 8,155,056 B2
(45) Date of Patent: Apr. 10, 2012

(54) METHOD AND APPARATUS FOR CONTROLLING TRAFFIC CONGESTION IN A WIRELESS COMMUNICATION NETWORK

(75) Inventors: Heinz A. Miranda, Cary, IL (US); Shawn W. Hogberg, Chandler, AZ (US); Steven Sobieszek, Addison, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 160 days.

(21) Appl. No.: 12/332,507

(22) Filed: Dec. 11, 2008

(65) Prior Publication Data
US 2010/0149970 A1    Jun. 17, 2010

(51) Int. Cl.
*H04Q 7/00* (2006.01)
(52) U.S. Cl. .......... 370/328; 370/338; 455/435.3
(58) Field of Classification Search .......... 370/230, 370/238
See application file for complete search history.

(56) References Cited

U.S. PATENT DOCUMENTS

| 5,867,787 | A | 2/1999 | Vudali et al. | |
| 6,493,344 | B1* | 12/2002 | Brueckheimer et al. | ... 370/395.1 |
| 2006/0171410 | A1* | 8/2006 | Jung et al. | ...... 370/447 |
| 2007/0008884 | A1* | 1/2007 | Tang | ............ 370/230 |
| 2007/0038363 | A1* | 2/2007 | McGrath | ......... 701/117 |
| 2008/0298249 | A1* | 12/2008 | Baker et al. | ...... 370/238 |
| 2009/0067335 | A1* | 3/2009 | Pelletier et al. | ... 370/238 |

FOREIGN PATENT DOCUMENTS

| EP | 1111888 A2 | 11/2000 |
| EP | 1052866 B1 | 6/2006 |
| WO | 2008042523 A4 | 4/2008 |
| WO | 2008091350 A1 | 7/2008 |

OTHER PUBLICATIONS

Hickery, Dan: Patents Act 1977: Combined Search and Examination Report under Section 17 and 18(3), Intellectual Property Office, South Wales, searched: Mar. 12, 2010, for appl. No. GB0921494.1, all pages.
Nehme, Rimma V. et al.: "ClusterSheddy: Load Shedding Using Moving Clusters over Spatio-temporal Data Streams", Springer Berlin/Heidelberg, vol. 4443/2008, ISBN: 978-3-540-71702-7, Aug. 2, 2007, pp. 637-651.
Harris, John M. et al.: Location Based 911 Call Center Outgoing Message Control, Performance Analysis Department/Network Advanced Technology/GTSS, Motorola Technical Developments, May 16, 2000, pp. 1-2.
GB Examination Report for Counterpart Application Dated Jul. 14, 2011.

* cited by examiner

*Primary Examiner* — Seema S Rao
*Assistant Examiner* — Wanda Z Russell
(74) *Attorney, Agent, or Firm* — Steven A. May; Anthony P. Curtis; Daniel R. Bestor

(57) ABSTRACT

In a wireless communication system, a method and apparatus for controlling traffic congestion includes determining that the traffic congestion at a plurality of geographical locations in the wireless communication network is above a predetermined threshold value. At least one geographical location of the plurality of geographical location is identified, wherein the identification of the at least one geographical location is based on the determination of the traffic congestion in the plurality of geographical location. At least one network node of a plurality of network nodes located in proximity of the identified geographical location is selected and assigned a first level of priority during congestion control.

13 Claims, 3 Drawing Sheets

METHOD AND APPARATUS FOR CONTROLLING TRAFFIC CONGESTION IN A WIRELESS COMMUNICATION NETWORK

FIELD OF THE DISCLOSURE

The present disclosure relates generally to wireless communication network and more specifically to a method and apparatus for controlling traffic congestion in the wireless communication network.

BACKGROUND

Wireless communication networks are widely deployed to provide various communication services such as voice, packet data, multi-media broadcast, and text messaging. These wireless communication networks may be multiple-access systems capable of supporting communication for multiple users by sharing the available network resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement Wideband CDMA (W-CDMA) or cdma2000. W-CDMA is described in documents from 3rd Generation Partnership Project (3GPP). CDMA2000 is described in documents from a consortium named "3rd Generation Partnership Project 2" (3GPP2). 3GPP and 3GPP2 documents are publicly available. WiMAX (Worldwide Interoperability for Microwave Access)-based systems are being designed and developed for operation in licensed bands, such as 2.3 GHz, 2.5 GHz, 3.3 GHz, 3.5 GHz etc.

In case of emergency situations or catastrophic events, the wireless communication networks protect a mobility manager from overloading by applying known access control and/or load shedding techniques. These access control and/or load shedding techniques control the call flow level by either distributing the call flow or terminating existing communication sessions. In some cases, the access control techniques may also prevent some wireless communication devices from initiating a communication session under emergency situations. However, existing wireless communication networks are unable to provide traffic congestion techniques for high profile and emergency locations that may require higher priority under emergency situations.

Accordingly, there is a need for a method and apparatus for controlling traffic congestion in the wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
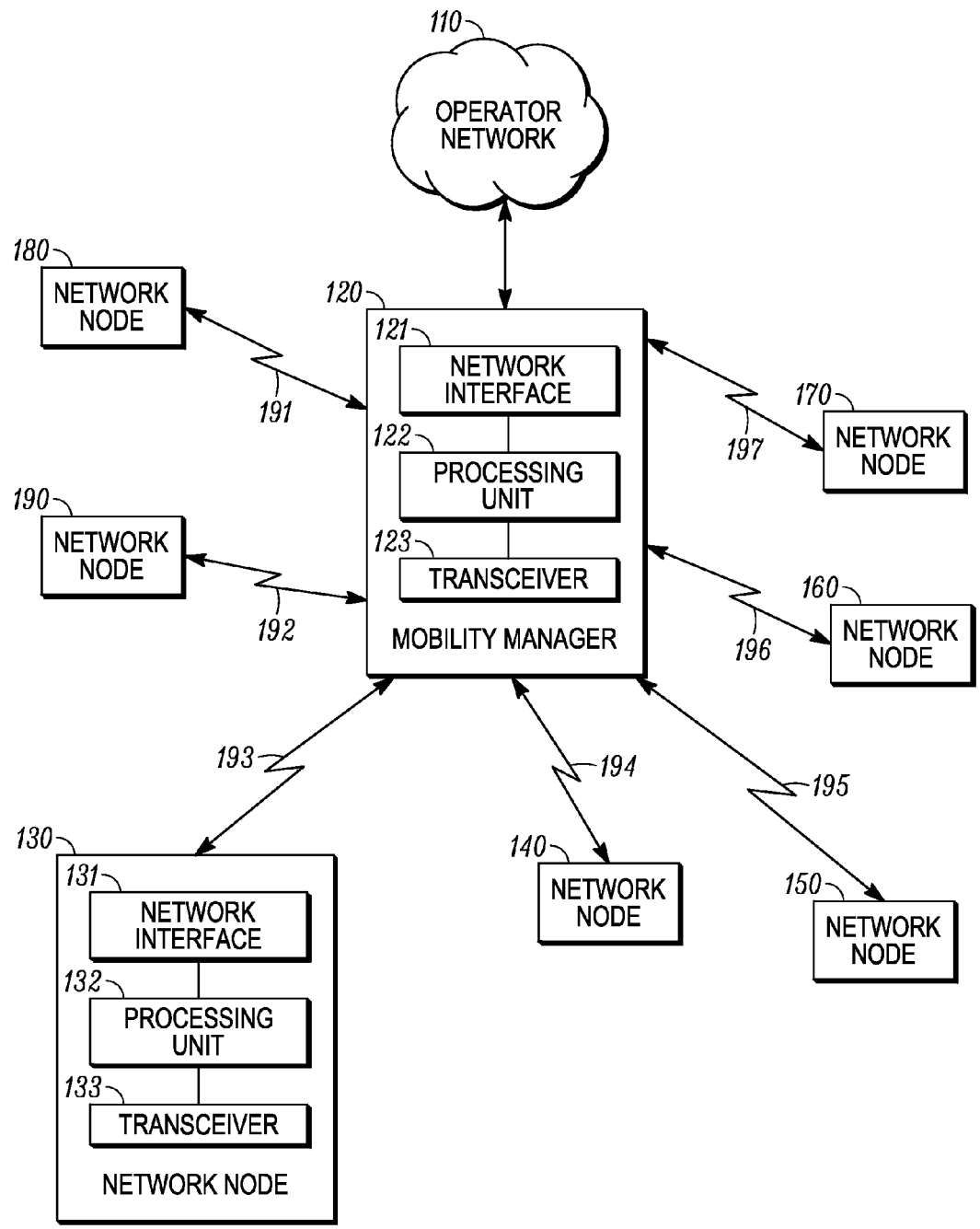
FIG. 1 is a system diagram illustrating a wireless communication network in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Pursuant to various embodiments, a method for controlling traffic congestion in a wireless communication network includes determining that the traffic congestion at a plurality of geographical locations in the wireless communication network is above a predetermined threshold value. The method also includes identification of at least one geographical location of the plurality of geographical locations based on the determination of the traffic congestion in the plurality of geographical locations. Further, at least one network node is selected of a plurality of network nodes located in proximity of the identified geographical location and a first level of priority is assigned to the selected network node during traffic congestion.

In another embodiment, the method includes identification of a predefined list of critical network nodes in the wireless communication network after the determination that the traffic congestion in the wireless communication network is above a predetermined threshold value. A higher priority is assigned to the predefined list of critical network nodes during congestion control as compared to other network nodes of the wireless communication network.

Referring now to the figures, FIG. 1 is a system diagram illustrating a wireless communication network 100 in accordance with some embodiments of the present invention. At present, standards bodies such as OMA (Open Mobile Alliance), 3GPP (3rd Generation Partnership Project), 3GPP2 (3rd Generation Partnership Project 2), IEEE 802 (Institute of Electrical and Electronics Engineers), and Worldwide Interoperability for Microwave Access (WiMAX) Forum are developing standards specifications for wireless telecommunications systems.

Communication network 100 is depicted in a generalized manner. For example, the communication network 100 is shown to include a mobility manager 120, network nodes 130-190, and an operator network 110. The network nodes 130-190 are shown associated with the mobility manager 120 to receive services from the operator network 110. The mobility manager 120 is shown connected to the network nodes 130-190 using interfaces 191-197, respectively. Interfaces 191-197 are in accordance with a particular access technology supported by the network nodes 130-190. The interfaces 191-197 may be wired or wireless based on requirement of various embodiments. In one example, the network nodes 130-190 may utilize the same access technology or different access technologies. It should be understood that FIG. 1 depicts only nine network nodes 130-140; however the wireless communication network 100 may also include fewer or more network nodes.

Each of the network nodes 130-190 is located at different geographical location in the wireless communication network 100. Each of the network nodes 130-190 includes the capability to communicate with the mobility manager 120 through one or more communication protocols. The network nodes 130-190 may also use ad-hoc communication to connect directly to other network nodes in the communication network 100 and to execute applications that may utilize the ad-hoc connection. Each of the network nodes 130-190 provides wireless communication services to an associated coverage area, for example, a cell or a sector of a cell, and may comprise one or more of a base station, an access point, a Node B, a wireless access network controller such as a base station controller, a mobile switching center, and the like. It should be understood that FIG. 1 only depicts one mobility manager; however there may be more mobility managers that may communicate with an operator network via a network node.

In one example, each of the network nodes 130-190 is associated with a coverage area that may include multiple remote units. Each network node 130-190 may employ a same or a different access technology as the other network nodes in providing service to the node's corresponding coverage area. The remote units include the capability to communicate with the network nodes 130-190 through one or more wireless communication protocols, such as Advanced Mobile Phone System (AMPS), Code division multiple access (CDMA), Time division multiple access (TDMA), Global System for Mobile communications (GSM), Integrated Digital Enhanced Network (iDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 2000 (CDMA2000), and their variants. The remote unit may be a subscriber unit, also known as a user equipment or a mobile station, such as a mobile device, a cell phone, a mobile telephone, a pager, a radiotelephone, and a laptop computer that is wireless-enabled, or may be another network node, and so on.

Further, it should be understood that the network node need not be a stationary network node. Other types of access terminals which may include wireless terminals may be used herein as a network node. It should be understood that the term "network node" in the claims and description below may also include mobile wireless communication devices (e.g., mobile phones, wireless handheld computers), stationary wireless terminals (e.g., fixed wireless router) or other electronic operated devices that are coupled to a network.

Those skilled in the art will recognize that FIG. 1 does not depict all of the physical fixed network components that may be necessary for network 100 to operate but only those network components and logical entities particularly relevant to the description of embodiments herein. For example, FIG. 1 depicts the mobility manager 120 comprising a network interface 121, a processing unit 122, and a transceiver 123. The network node 130 comprises a network interface 131, a processing unit 132, and a transceiver 133. Further, it should be understood that network nodes 140-190 may also comprise similar components as depicted for the network node 130.

In addition, network node platforms are known to refer to a wide variety of consumer electronic platforms such as, but not limited to, base stations (BSs), access terminals (ATs), and terminal equipment. Further, depending on the embodiment, the network node 130 may additionally comprise a keypad (not shown), a speaker (not shown), a microphone (not shown), and/or a display (not shown). Processing units, transceivers, keypads, speakers, microphones, and displays that may be used in network nodes and/or remote units are all well-known in the art.

For example, processing units are known to comprise basic components such as, but neither limited to nor necessarily requiring, microprocessors, microcontrollers, memory devices, application-specific integrated circuits (ASICs), or logic circuitry. Such components are typically adapted to implement algorithms or protocols that have been expressed using high-level design languages or descriptions, expressed using computer instructions, expressed using signaling flow diagrams, or expressed using logic flow diagrams.

Thus, given a high-level description, an algorithm, a logic flow, a signaling flow, or a protocol specification, those skilled in the art are aware of the many design and development techniques available to implement a processing unit that performs the given logic. Therefore, network nodes 130-190 and mobility manager 120 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more radio access network (RAN) components, such as a base transceiver station (BTS) or a base station controller (BSC), a Node-B or a radio network controller (RNC), or an HRPD access network (AN) or packet control function (PCF), or implemented in or across one or more AN components, such as an access service network (ASN) gateway or ASN base station (BS), an access point (AP), a wideband base station (WBS), or a WLAN (wireless local area network) station.

Operation of embodiments in accordance with the present invention occurs substantially as follows. The mobility manager 120 determines that traffic congestion in the wireless communication network 100 has increased over a predetermined threshold value. The predetermined threshold value may be based on various network resource usage metrics, for example, an increase in a number of users accessing the resources of the wireless communication network 100, a number of communication sessions established at a particular instance of time, and so on. After the mobility manager 120 determines that traffic congestion has reached or crossed the predetermined threshold value, the mobility manager 120 identifies a geographical location in the wireless communication network 100. The geographical location may be identified from a predefined list of geographical locations that have been defined as sensitive geographical locations. In another example, the geographical location may be identified based on a critical and/or emergency and/or a catastrophic situation and/or event associated with, such as occurring at, the identified geographical location.

In one embodiment, an operator operating the mobility manager 120 after determining that the traffic congestion has crossed the threshold value may manually enter the details of the geographical location in the system. These details may include a name of the geographical location and/or coordinates of the geographical location. In one example, the operator may also identify the geographical location by clicking on a map-based Graphical User Interface (GUI) and/or entering an identifier, such as an identification number, associated with a network node in the vicinity of the geographical location. In case of an emergency situation, after the operator identifies the geographical location of the emergency situation, the mobility manager 120 may locate at least one network node with high traffic congestion and/or traffic load that is in the proximity of the geographical location. It should be understood that more than one geographical location may be identified that may be located in the proximity and/or vicinity of the emergency situation.

The selection of the network nodes located in the proximity of the geographical location may be based on a distance range from the geographical location, manual selection by the operator operating the mobility manager 120, and/or a predefined list of critical network nodes. An appropriate distance range may be up to a designer of communication system 100, for example, the network nodes that are within 10 km radii of the identified geographical location may be defined as being within the proximity of the geographical location. In one example, the network nodes associated with the cell sites located within the geographical location may be defined as within the proximity of the geographical location.

After the mobility manager 120 identifies at least one network node located within the proximity of the geographical location, a higher level of priority during congestion control is assigned to the identified at least one network node as compared to other network nodes of the wireless communication network 100. In one example, all the network nodes that are selected to be in proximity of the geographical location are assigned a higher priority than the other network nodes of the wireless communication network 100. In addition, the mobility manager 120 may identify at least one network node neighboring to the selected network node and assign, to the at least one neighboring network node, a priority that is higher as compared to other network nodes of the wireless communication network 100 but that is lower than the priority assigned to the network nodes that are selected as being in the proximity of the geographical location. In one embodiment, the network nodes selected in proximity to the geographical location may be assigned a first level of priority and the neighboring network nodes of the selected network nodes may be assigned a second level of priority, where the first level of priority is higher than the second level of priority and where the non-selected, non-neighboring network nodes have a priority that is less than the second level of priority. In this case, the priorities assigned to the selected network nodes and the neighboring network nodes of the selected network nodes are higher as compared to other network nodes in the wireless communication network 100.

In one embodiment of the present invention, the mobility manager 120 forms a group (a first group) at the identified geographical location comprising the selected network nodes. Another group (a second group) may be formed at the identified geographical location that comprises the neighboring network nodes of the selected network nodes. In this case, the first group may be assigned the first level of priority and the second group may be assigned the second level of priority, where the first level of priority is higher as compared to the second level of priority.

In another embodiment of the present invention, the network nodes and/or groups that are assigned with the first level of priority and/or the second level of priority are less constrained than lower priority nodes/groups with respect to access control and/or load shedding techniques, that is, any access limitations or any load shedding applied in communication system 100 is minimized for network nodes and/or groups that are assigned the first level of priority and/or the second level of priority, wherein the nodes and/or groups that are assigned the first level of priority may be even more minimally impacted than the nodes and/or groups that are assigned the second level of priority. For example, the communication sessions initiated from these network nodes and/or the groups may be given higher priority as compared to communication sessions that are initiated from other network nodes of the wireless communication network 100. Assigning first and/or second level of priority to the network nodes by the mobility manager 120 may also include providing highest network connectivity to the identified geographical location associated with the network nodes. In another example, the mobility manager 120 may reduce the access to network resources of the other network nodes that are not selected and/or associated with the identified geographical location, or may require greater load shedding by such other network nodes than is required of the higher priority nodes in the event of a need to free up network resources.

In still another embodiment of the present invention, the mobility manager 120 may identify a predefined list of critical network nodes in the wireless communication network 100 in response to determining that the traffic congestion in the wireless communication network 100 is above a predetermined threshold value. The mobility manager 120 may then apply higher priority to the predefined list of critical network nodes as compared to other network nodes of the wireless communication network.

For example, any of the network nodes 130-190 may be predefined as a critical network node and may be identified by the mobility manager after the traffic congestion crosses the predetermined threshold value. By way of another example, the predefined list of critical network nodes of the wireless communication network 100 may be defined as critical network nodes by an operator operating the mobility manager 120. The critical network nodes are the network nodes that cover the geographical locations where it is important to have communication services available at the particular time, such as locations associated with emergency service providers such as hospitals or airports, or residences of high profile customers, and so on. The operator may predefine some network nodes of the wireless communication network 100 as critical by entering coordinates of the network nodes and/or by entering the name of the critical geographical locations. In one example, the operator may also identify the critical network nodes by clicking on a map-based Graphical User Interface (GUI) and/or entering an identifier of a network node in the vicinity of the critical geographical location. In one example, the mobility manager 120 may predefine the network nodes that are in the vicinity and/or proximity of the critical geographical location as critical network nodes and as always having a high priority as compared to other network nodes of the wireless communication network 100.

After the mobility manager 120 has identified the critical network nodes, the critical network nodes are then grouped into one or more groups. Each of the groups will comprise at least one critical network node of the identified critical network nodes. These groups will be formed at different geographical locations of the wireless communication network 100. In one embodiment of the present invention, the mobility manager 120 may identify that a critical network node of the identified critical network nodes comprises a pre-defined higher priority as compared to other critical network nodes. In this case, the group associated with the critical network node having the pre-assigned higher priority, that is, all network nodes included in the group comprising the critical network node having the pre-assigned higher priority, is also assigned higher priority during congestion control as compared to other network node groups of the wireless communication network 100.

Assigning higher priority to a group as compared to another group may comprise applying minimal load shedding during traffic congestion by the group with the highest priority relative to the other groups, providing highest network connectivity to the group associated with the at least one critical network node having a pre-defined higher priority as compared to other critical network nodes, and/or reducing access of other network nodes to the network resources of the wireless communication network 100. In any case, the group associated with the critical network node having higher priority as compared to other critical network nodes will be given more privileges for accessing the network resources as compared to other critical network nodes and/or other network nodes of the wireless communication network 100.

In one embodiment, the processing unit 122 coupled to the transceiver 121 of the mobility manager 120 determines that traffic congestion at a plurality of geographical locations in the wireless communication network 100 is above a predetermined threshold value. The processing unit 122 then identifies at least one geographical location of the plurality of geographical locations, wherein the identification of the at least one geographical location is based on the determination of the traffic congestion in the plurality of geographical location. The processing unit 122 selects at least one network node of a plurality of network nodes located in proximity of the identified geographical location and assigns a first level of priority during congestion control to the selected network node.

In another embodiment, the processing unit 122, in response to determining that the traffic congestion in the wireless communication network 100 is above the predetermined threshold value, identifies a predefined list of critical network nodes in the wireless communication network 100. The processing unit 122 applies higher priority during congestion control to the predefined list of critical network nodes as compared to other network nodes of the wireless communication network 100.

FIG. 1 more generally depicts the different groups of embodiments of the present invention, and it is believed that a more detailed description of particular embodiments of the present invention will assist the reader in understanding and implementing the more generically described embodiments above. The embodiments described below are provided as examples. They are provided as particular, and quite specific, example embodiments of the present invention. They are intended to further the reader's understanding of the variety of possible embodiments rather than to limit the scope of the invention.

Figure 2:
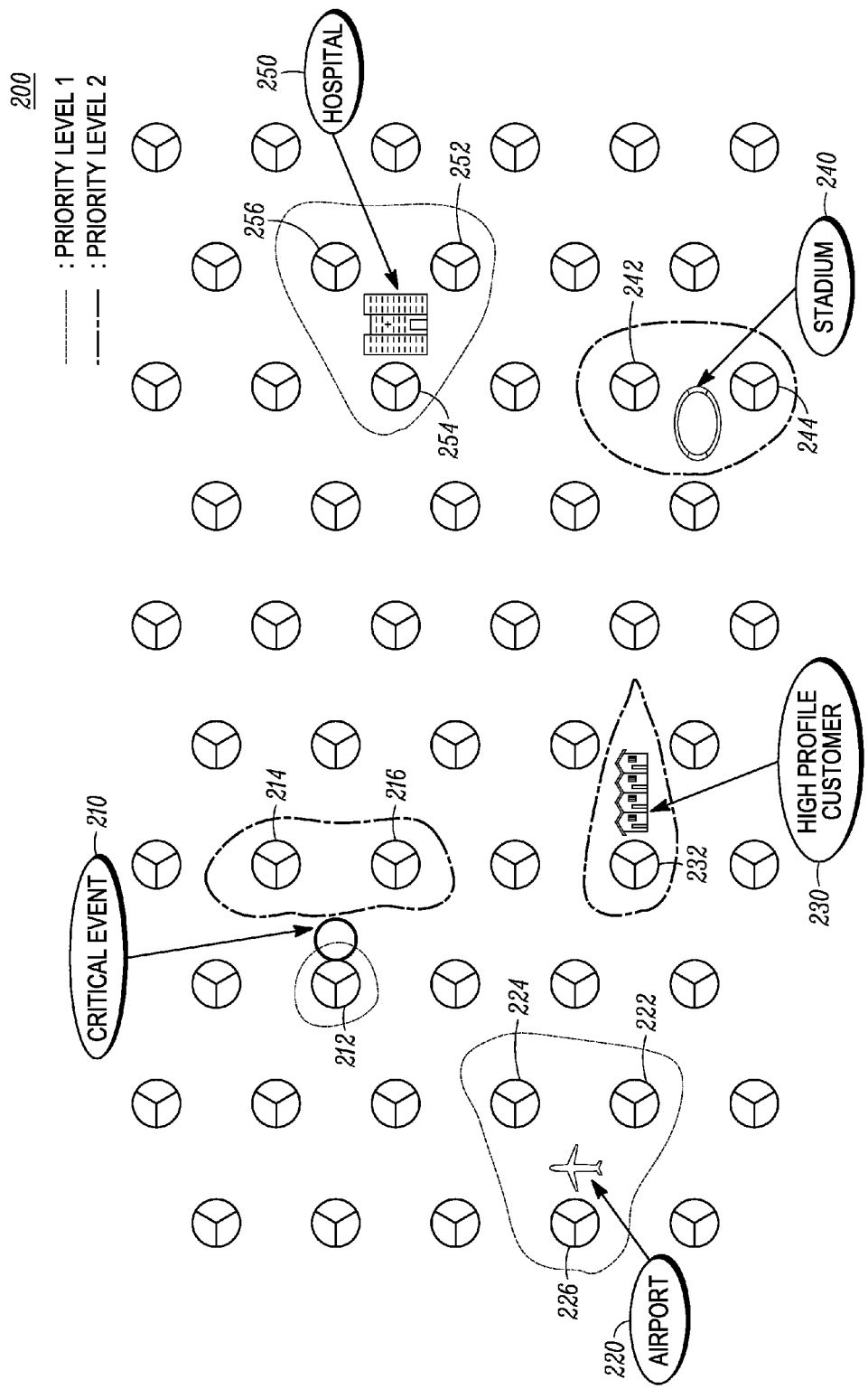
FIG. 2 is a system diagram illustrating a more specific wireless communication network in accordance with some embodiments of the present invention.

FIG. 2 is a system diagram illustrating exemplary implementations of a wireless communication network 200 in accordance with various embodiments of the present invention. FIG. 2 depicts multiple network nodes 212-216, 222-226, 232, 242, 244, and 252-256. The multiple network nodes are grouped at different geographical locations in the wireless communication network 200 and are assigned priorities based on the geographical locations they are associated with.

In one example, as shown in FIG. 2, the network node 212 is assigned a first level of priority as it is nearest to a critical event 210. This assignment of the first level of priority to the network node 212 is manually done by the operator operating a mobility manager. The nodes neighboring node 212, that is, nodes 214 and 216, are assigned a second level of priority as compared to the network node 212. The first level of priority is higher as compared to the second level of priority, and the first level of priority and the second level of priority are higher as compared to the levels assigned to the other network nodes of the wireless communication network 200.

In another example, network nodes 222, 224, and 226 that are in proximity to an airport 220 may be assigned with a first level of priority. For example, an operator of system 200 may determine the airport 220 to be a high priority location. This first level of priority assigned to the network nodes 222, 224, and 226 may be predefined by the operator of a mobility manager (not shown in FIG. 2). In a similar example, the network nodes 252, 254, and 256 that are in proximity to a hospital 250 may be assigned with a first level of priority. On the other hand, network node 232 in proximity of a high profile customer's house and network nodes 242 and 244 in proximity of a stadium 240 are given a second level of priority. Even in this case, the first level of priority is higher as compared to the second level of priority.

The first level of priority or the second level of priority may be predefined and/or dynamically assigned based on the event. In the case of the critical event 210, the network node 212 is identified by the mobility manger as being in the proximity to the critical event 210. In this example, after the mobility manager determines that the traffic congestion has reached the predefined threshold value and needs to be controlled, the operator operating the mobility manager then manually enters the location of the critical event 210 and/or enters the co-ordinates of the network nodes in proximity to the critical event 210. The operator may then determine network node 212 as being closest and/or in proximity to the critical event 210 and assigns a first level of priority. The operator then determines the network nodes 214 and 216 as neighboring nodes to the network node 212, and assigns a second level of priority to the network nodes 214 and 216.

In another example, the priorities assigned to the network nodes 222-226, 232, 252-256, and 242-244 may be predefined by the operator based on the geographical locations they are associated with.

Figure 3:
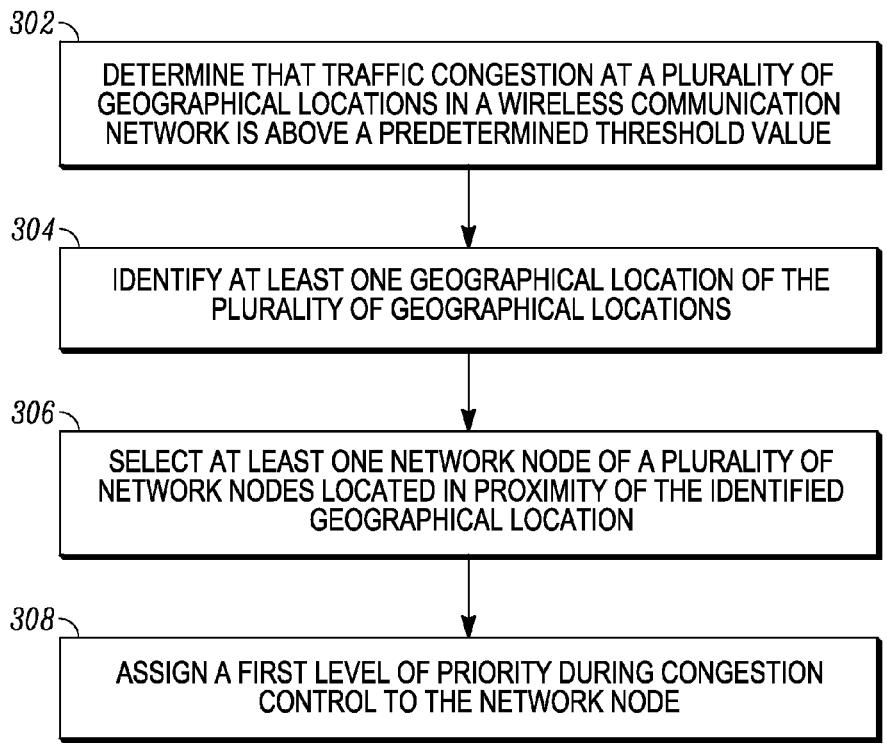
FIG. 3 is a flowchart of a method for controlling traffic congestion in the wireless communication network in accordance with some embodiments of the present invention.

FIG. 3 is a flowchart of a method 300 for controlling traffic congestion in the wireless communication network 100 in accordance with various embodiments of the present invention. The method 300 begins with a mobility manager determining 302 that traffic congestion at a plurality of geographical locations in the wireless communication network 100 is above a predetermined threshold value. The mobility manager then identifies 304 at least one geographical location of the plurality of geographical locations and selects 306 at least one network node of a plurality of network nodes located in proximity of the identified geographical location. The mobility manager then assigns 308 a first level of priority during congestion control to the selected network node.

Figure 4:
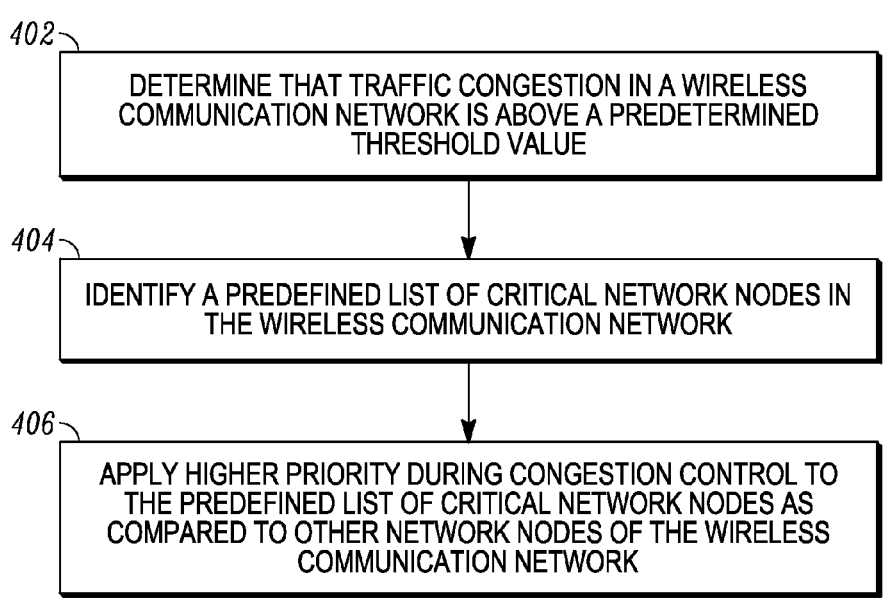
FIG. 4 is a flowchart of a method for controlling traffic congestion in the wireless communication network in accordance with some embodiments of the present invention.

FIG. 4 is a flowchart of a method 400 for controlling traffic congestion in the wireless communication network 100 in accordance with various embodiments of the present invention. The method 400 begins with a mobility manager determining 402 that traffic congestion at a plurality of geographical locations in the wireless communication network 100 is above a predetermined threshold value. The mobility manager then identifies 404 a predefined list of critical network nodes in the wireless communication network 100 and applies 406 a higher priority during congestion control to the predefined list of critical network nodes as compared to other network nodes of the wireless communication network 100.

Advantages of the various embodiments may include maximizing network resource access for network nodes that are associated with a critical event while restricting access for other network nodes of a wireless communication network and performing congestion control based on a geographical location. Those skilled in the art will realize that the above advantages and other advantages described above are merely illustrative and are not meant to be a complete rendering of all of the advantages of the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling communications traffic congestion in a wireless communication network based on radio access network (RAN) component geographic location, each RAN component providing one or more communications services to user equipment operating within a respective wireless coverage area of the RAN component, the method comprising:
    determining that the communications traffic congestion at a plurality of geographical locations in the wireless communication network, due to the providing of the one or more communications services to the user equipment, is above a predetermined threshold value and responsively:
        identifying at least one higher priority geographical location of the plurality of geographical locations relative to other geographical locations in the plurality; and
        subsequently selecting at least one RAN component of a plurality of RAN components, located in proximity of the identified at least one higher priority geographical location;
    assigning a first level of priority during congestion control to the selected RAN component; and
    assigning a second level of priority during congestion control to another RAN component of the plurality, the second level of priority being lower than the first level of priority.

2. The method of claim 1, further comprising:
    identifying the another RAN component as a neighbor RAN component neighboring the selected RAN component prior to assigning the second level of priority to the another RAN component.

3. The method of claim 2, the method further comprising forming a group at the identified geographical location comprising the selected RAN component and associated with the first priority level.

4. The method of claim 2, the method further comprising forming a group at the identified geographical location comprising the neighboring RAN component and associated with the second priority level.

5. The method of claim 2, wherein assigning one or more of the first level of priority and the second level of priority during congestion control comprises one or more of minimizing access control of first priority RAN components relative to second priority RAN components, minimizing load shedding of first priority RAN components relative to second priority RAN components, providing higher network connectivity to the first priority RAN components relative to the second priority RAN components, and reducing access of the second priority RAN components to network resources relative to the first priority RAN components.

6. The method of claim 1, wherein the at least one higher priority geographical location is identified from a predefined list of higher priority geographical locations maintained within the wireless communication network.

7. The method of claim 1, wherein the at least one RAN component is selected based on: (i) a distance range from the at least one higher priority geographical location, (ii) a manual entry made by an operator, or (iii) a predefined list of critical RAN components.

8. The method of claim 1, wherein the selected RAN component is preassigned a higher priority as compared to other RAN components of the wireless communication network based on its proximity to the identified higher priority geographical location.

9. The method of claim 1, further comprising grouping RAN components into one or more groups formed at different geographical locations of the wireless communication network, all RAN components included in each group having a same particular priority during congestion control.

10. The method of claim 1, wherein different sets of RAN components in proximity to different particular geographic locations are assigned priorities dependent on the particular geographic location, and the priority and number of RAN components of each set are independent of the other sets.

11. The method of claim 10, wherein the particular geographic location is predefined prior to determining that the traffic congestion exceeds the predetermined threshold value or is dynamically assigned due to the occurrence of an emergency event at the particular geographic location.

12. The method of claim 1, wherein the priority of the selected RAN component is predefined and based on the identified geographical location or is dynamically assigned at the time of the event and based on the type of the event occurring at the identified geographical location.

13. A radio access network (RAN) component for providing wireless network coverage across geographic coverage areas, the RAN component providing one or more communications services to user equipment operating within a respective wireless coverage area of the RAN component, the RAN component comprising:
  a transceiver,
  a processing unit, coupled to the transceiver, for:
    determining that communication traffic congestion at a plurality of geographical locations in a wireless communication network, due to the providing of the one or more communications services to the user equipment, is above a predetermined threshold value and responsively:
      identifying at least one higher priority geographical location of the plurality of geographical locations relative to other geographical locations in the plurality; and
      subsequently selecting at least one RAN component of a plurality of RAN components, located in proximity of the identified at least one higher priority geographical location;
    assigning a first level of priority during congestion control to the selected RAN component; and
    assigning a second level of priority during congestion control to another RAN component of the plurality, the second level of priority being lower than the first level of priority.

* * * * *